United States Patent [19]
Yarrow et al.

[11] 4,024,455
[45] May 17, 1977

[54] ROTARY INVERTERS FOR CONVERTING D.C. TO A.C.

[75] Inventors: Christopher John Yarrow, Bradford; Ronald Johnson, Leeds, both of England

[73] Assignee: Lucas Industries Limited, Great Britain

[22] Filed: Mar. 4, 1976

[21] Appl. No.: 663,935

[30] Foreign Application Priority Data
Mar. 6, 1975 United Kingdom ............... 9287/75

[52] U.S. Cl. ................................. 321/29; 310/129; 310/160
[51] Int. Cl.² ........................................ H02M 7/54
[58] Field of Search .......... 310/129, 140, 160, 169, 310/170, 176; 321/28, 29, 30, 55, 62–64

[56] References Cited
UNITED STATES PATENTS

| | | | |
|---|---|---|---|
| 1,300,308 | 4/1919 | Walker | 321/55 |
| 1,604,431 | 10/1926 | Weichsel | 321/29 X |
| 1,613,625 | 1/1927 | Stoller | 310/129 |
| 1,831,564 | 11/1931 | Hull | 310/160 |
| 2,253,966 | 8/1941 | Baumann | 310/160 |
| 2,761,081 | 8/1956 | Clark | 310/160 X |

FOREIGN PATENTS OR APPLICATIONS 80,103  2/1920  Austria ............................. 310/129

Primary Examiner—William M. Shoop
Attorney, Agent, or Firm—Ladas, Parry, Von Gehr, Goldsmith & Deschamps

[57] ABSTRACT

A rotary inverter for converting d.c. to a.c. includes a rotary field winding and a stationary armature including two windings. One winding is supplied with d.c. switched in synchronism with the rotation of the field winding. The other winding is electrically isolated from the first mentioned winding but is magnetically coupled thereto and provides the a.c. output. The two windings occupy the same slots in the armature.

4 Claims, 4 Drawing Figures

ROTARY INVERTERS FOR CONVERTING d.c. TO a.c.

This invention relates to rotary inverters for converting d.c. to a.c.

It has already been proposed to provide an inverter with a rotary field winding and a stationary armature winding with switching means controlling the connection of a plurality of tappings on the armature winding to the d.c. supply. With such an arrangement both the driving current (i.e. the switched d.c.) and the a.c. output current drawn by the a.c. load on the inverter both flow through the same armature winding and high peak currents pass under certain load conditions. With such an arrangement it is difficult to obtain a neutral and also a large mass of conductor is required to carry the peak currents.

In accordance with the present invention an invertor comprises the combination of a rotary field winding, a stationary armature winding including two separate winding portions which are electrically isolated from one another but magnetically coupled together, switching means for controlling the connection of a d.c. supply to tappings on one armature winding portion in synchronism with the rotation of the field winding, and a.c. output terminals connected to the other armature winding portion.

With such an arrangement said one armature winding portion may be a mesh winding and the other a star-connected winding to provide a neutral without extra transformers etc.

An example of the invention is illustrated in the accompanying drawings as applied to a generator comprising an alternator, a rectifier and an inverter. In the drawings.

Figure 1:
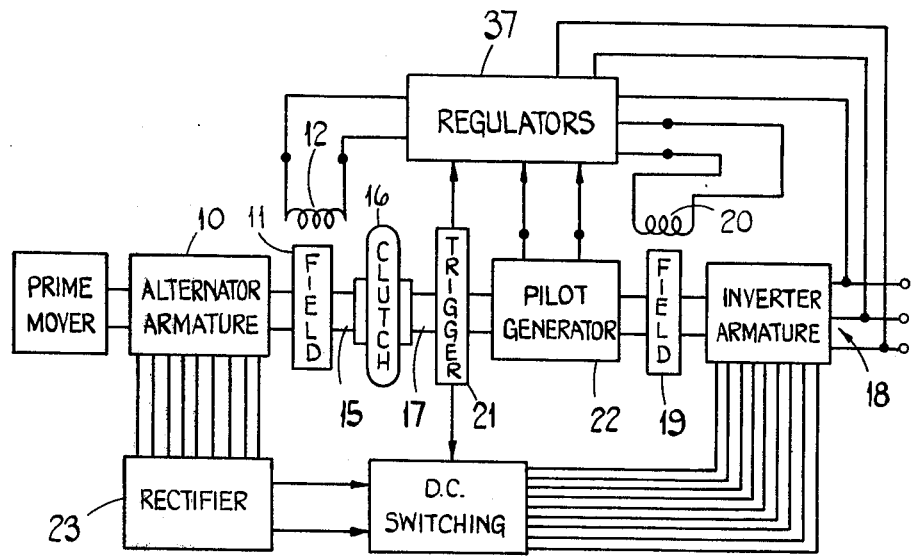
FIG. 1 is a schematic diagram of the generator.
Figure 2:
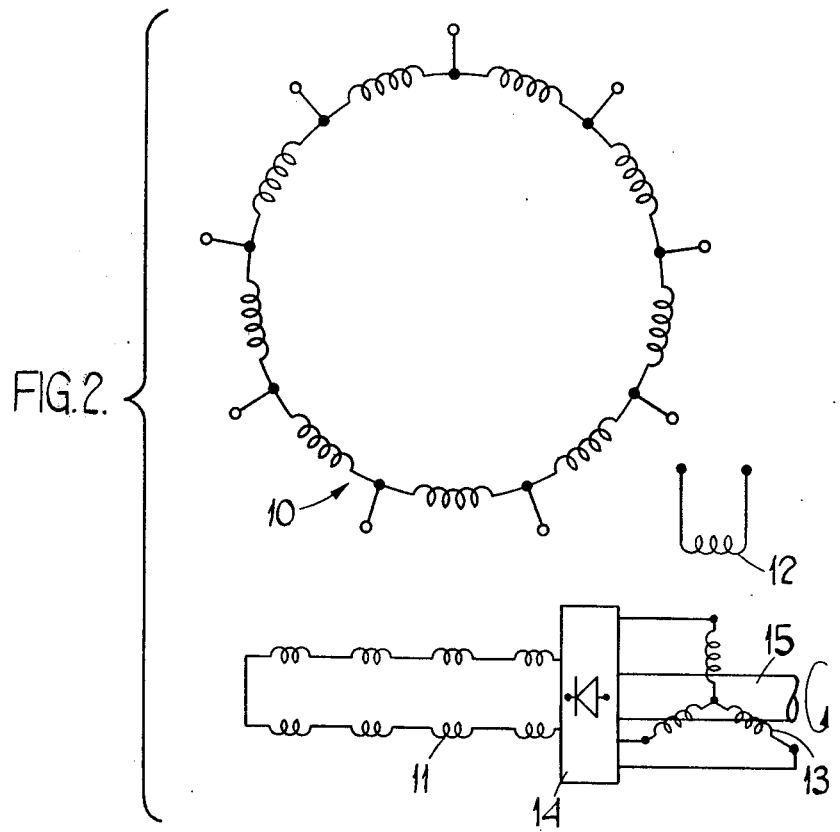
FIG. 2 is a schematic circuit diagram of the alternator.

Referring firstly to FIG. 1 the generator includes a nine-phase alternator having a stationary armature 10 and a two-pole rotating field winding 11 brushlessly coupled to a field drive winding 12. As shown in FIG. 2 such coupling is achieved by a three-phase winding 13 on the rotary shaft of the generator in the field of the field drive coil 12. A rectifier assembly 14 also on the shaft connects the winding 13 to the field winding 11 so that the winding 11 receives d.c. at a level dependent on the d.c. in the coil 12 and the speed of rotation of the shaft. The nine-phase a.c. output voltage of the armature likewise depends on the d.c. applied to the coil 12 and the speed of rotation of the shaft 15. The shaft 15 is driven by a prime mover, the speed of which varies in use.

The shaft 15 is connected via a clutch 16 to a shaft 17 of an inverter having a non-rotatable armature 18, a rotary field winding 19 and a drive coil 20 for the field winding 19. Also on the shaft 17 is a trigger generator 21 and a pilot generator 23.

The nine-phase output of the alternator armature 10 is applied to a rectifier assembly 23, the d.c. output of which is applied to a d.c. switching circuit 24, providing a nine-phase output to the armature 18 of the inverter. As shown in FIG. 2a the armature winding 18 is actually in two portions namely a d.c. portion 18a in the form of a ring of nine coils and an a.c. portion 18b which is a star-connected three-phase winding. The winding portions 18a and 18b are contained in the same slots in the armature as shown in FIG. 3a and are therefore magnetically coupled together, but are totally isolated from one another electrically. The slots are preferably specially shaped as shown with ribs 25 on the sides of the slots to separate the windings 18a, 18b.

Figure 3:
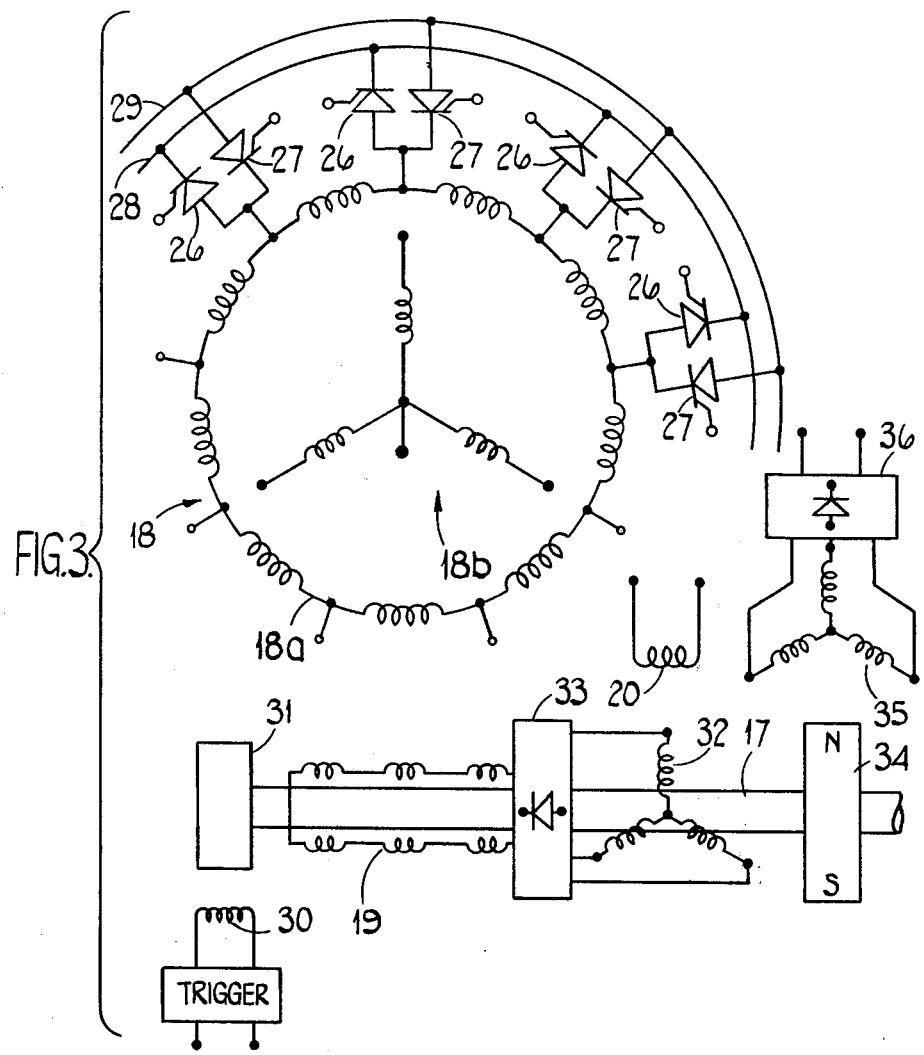
FIG. 3 is a schematic circuit diagram of the invertor.
Figure 3A:
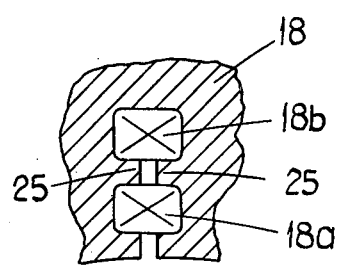
FIG. 3a is a diagrammatic fragmentary section of an armature of the inverter.

FIG. 3 also shows part of the d.c. switching circuit associated with the armature windings 18a. This circuit includes nine thyristors 26 and nine thyristors 27. Each thyristor 26 has its anode connected to the cathode of a corresponding one of the thyristors 27 and to the interconnection of two of the coils of armature winding 18a. The cathode of each thyristor 26 is connected to a negative d.c. rail 28 and the anode of each thyristor 27 is connected to a positive d.c. rail 29. The gates of the thyristors 26, 27 are connected to eighteen different coils 30 forming part of the trigger which is described in more detail in our Co-pending British Patent application No. 9288/75 of even date. Briefly, however, the trigger includes a permanent magnet rotor 31 having three north poles and three south poles with one set of poles each subtending a very substantially larger angle at the axis of the rotor than the other. The separate coils referred to are positioned around the rotor on a stator structure and each produces three short pulses during each revolution of the rotor as the three short poles pass it. Each coil is directly connected between the gate and cathode of the associated thyristor.

The inverter field coil 19 is again a two pole structure coupled to its drive winding 20 by a three-phase rotary winding 32 and a rectifier 33. The current in the field winding 19 again depends on the current in the winding 20 and the speed of the shaft 17.

The pilot generator 22 includes a two pole permanent magnet rotor 34, a three-phase stationary winding 35 and a rectifier 36.

The current in the field drive windings 12 and 20 is supplied by the pilot generator 22 and regulated by a regulator unit 37 to control the frequency and voltage amplitude of the a.c. output of the inverter armature winding 18b. The regulator unit 37 derves its amplitude input signal directly from the inverter output terminals but its frequency input signal is derived from an additional winding in the trigger generator which provides an a.c. output at nine times the frequency of the inverter output. This higher frequency is employed to permit a better accuracy of control to be obtained. The principle of operation is for the regulator for the inverter field winding to be controlled by the amplitude and for the regulator for the alternator field winding to the controlled by the frequency. In steady running conditions switching of the d.c. output of the rectifier 23 by the switching circuit creates a rotating inverter armature magnetic field which interacts with the rotating inverter field winding magnetic field to maintain rotation of the inverter rotor. The required output voltage is obtained from the armature winding 18b.

The regulators 37 are described in more detail in Co-Pending British Patent application No. 9290/75 of even date.

We claim:

1. A rotary inverter comprising the combination of a rotary field winding, a stationary armature winding including two separate winding portions which are electrically isolated from one another but magnetically coupled together, switching means for controlling the connection of a d.c. supply to tappings on one armature winding portion in synchronism with the rotation of the field winding, and a.c. output terminals connected to the other armature winding portion.

2. A rotary inverter as claimed in claim 1 in which said one armature winding portion is a mesh winding and the other is a star-connected winding.

3. A rotary inverter as claimed in claim 2 in which the armature windings are supported in slots in an armature of ferromagnetic material, the same slots being used for both armature portions.

4. A rotary inverter as claimed in claim 3 in which each armature slot is shaped to provide a pair of ribs on the sides of the slot separating the two winding portions.

* * * * *